United States Patent [19]
Huggins et al.

[11] Patent Number: 5,894,551
[45] Date of Patent: Apr. 13, 1999

[54] SINGLE COMPUTER SYSTEM HAVING MULTIPLE SECURITY LEVELS

[76] Inventors: Frank Huggins, 1010 Acorn Dr., Arroyo Grande, Calif. 93420-1506; Aurelio Azpiazu, 5055 Forest La., Port Republic, Md. 20676

[21] Appl. No.: 08/663,986

[22] Filed: Jun. 14, 1996

[51] Int. Cl.⁶ .................................................. G06F 11/00
[52] U.S. Cl. ................................................. 395/187.01
[58] Field of Search .......................... 395/187.01, 186, 395/188.01, 282, 182.21, 200.48

[56] References Cited

U.S. PATENT DOCUMENTS

| | | | |
|---|---|---|---|
| 4,408,299 | 10/1983 | Young | 364/900 |
| 4,484,302 | 11/1984 | Carson et al. | 364/900 |
| 4,757,164 | 7/1988 | Baver et al. | 200/67 |
| 5,012,514 | 4/1991 | Renton | 380/4 |
| 5,012,515 | 4/1991 | McVitie | 395/186 |
| 5,075,884 | 12/1991 | Sherman et al. | 395/650 |
| 5,212,729 | 5/1993 | Schafer | 380/4 |
| 5,375,243 | 12/1994 | Parzych et al. | 395/725 |
| 5,430,865 | 7/1995 | Lazik | 395/182.21 |
| 5,497,460 | 3/1996 | Bailey et al. | 395/183.15 |
| 5,518,416 | 5/1996 | Kantner et al. | 439/352 |
| 5,521,913 | 5/1996 | Gridley | 370/58.2 |
| 5,544,334 | 8/1996 | Noll | 395/309 |
| 5,550,984 | 8/1996 | Gelb | 395/200.17 |
| 5,568,525 | 10/1996 | de Nijs et al. | 375/356 |

OTHER PUBLICATIONS

Microsoft Press, "Computer Dictionary", Microsoft Corp. p., 205, 1994.
Li, "Formalization of Self-Route Networks and the Rotary Switch", IEEE, pp. 438–446, 1994.

*Primary Examiner*—Robert W. Beausoliel, Jr.
*Assistant Examiner*—Scott Baderman
*Attorney, Agent, or Firm*—Jagtiani & Associates

[57] ABSTRACT

A computer system is provided that allows a user to switch between at least two networks having different levels of security without transferring data between the two networks. The computer system comprises a standard computer which includes a central processing unit (CPU) coupled to a random access memory (RAM), a power supply and a reset switch. The computer is coupled to each of two different network cards, each of which is in turn connected to a separate storage device, such as a hard drive. Each combination of a network card connected to a storage device constitutes a network. As in a standard computer, activating the reset switch reboots the CPU and clears the RAM. A user chooses between the two networks by using a rotary switch, a rocker switch, or a push button switch which activates one of the networks or the reset switch. The switch is constructed so that it is impossible to switch between the two networks before first activating the reset switch, thereby preventing data from being transferred between the two networks. By preventing the transfer of data between the two networks, each of the systems can have a different level of security.

16 Claims, 3 Drawing Sheets

SINGLE COMPUTER SYSTEM HAVING MULTIPLE SECURITY LEVELS

BACKGROUND OF THE INVENTION

1. Field of the Invention

The invention relates to security systems for data stored in computers.

2. Description of the Prior Art

In response to the need of preventing unauthorized access to confidential or classified data on computer systems, a number of different types of security systems have been developed. For example, some systems require the use of hardware keys to allow access to the hard drive. U.S. Pat. No. 5,012,514 to Renton describes such a system to prevent unauthorized access to the hard drive of a personal computer system which consists of a plug-in expansion board, a device driver program which requests the password for access, and other programs to establish the valid passwords for the security system. U.S. Pat. No. 5,212,729 to Schafer describes a security system which uses a hardware key. Schafer's invention provides data access protection using a security software program, a hardware key, and a user password to permit access to the hard disk or floppy disk used in a computer. The program stores the hardware key code and password on the disk and encrypts the disk partition data. An encryption algorithm operates at all times and prevents unauthorized entry once the computer is turned off.

However, the necessity to use a hardware key such as a plug-in expansion board makes the use of such a security system cumbersome. Therefore, many security systems rely solely on the use of passwords. U.S. Pat. No. 5,375,243 to Parzych et al. describes a hard drive system which prevents data access operations upon power up until the user enters a password. The password is located on the hard disk itself to prevent bypassing the hard drive's security using a new computer environment. A limit on computers which use the kind of password system described in Parzych is that they require that a computer be dedicated solely to secure use, because a user who does not have the password cannot use the computer at all. In situations when a user does both confidential and non-confidential work, the use of such a password system often requires that the user have a different computer for each kind of work. Because of the expense and inconvenience of providing multiple computers in an office environment, it would be desirable in many situations to provide a computer system which includes multiple levels of security in a single computer.

U.S. Pat. No. 5,075,884 to Sherman et al. describes a multi-level secure workstation having network access and multi-window human user interface wherein each workstation has a plurality of secure screen divisions. Security is achieved by providing a display interface coupled to receive data from independent secure processors for each screen division or from a secure source of data. There is a physical restriction on manual input or access to the display interface and isolation of processors from one another. A problem with this system is that it requires the use of multiple processors which makes such a system necessarily expensive.

Therefore, there exists a need for a security system which provides multiple levels of security for a computer having a single central processing unit.

SUMMARY OF THE INVENTION

The present invention provides a computer system that allows a user to switch between at least two networks having different levels of security without transferring data between the two networks. The computer system is a standard computer which includes a central processing unit (CPU) coupled to a random access memory (RAM), a power supply and a reset switch. The computer is coupled to each of two different network cards, each of which is in turn connected to a separate storage device, such as a hard drive. Each combination of a network card connected to a storage device constitutes a network. As in a standard computer, activating the reset switch reboots the CPU and clears the RAM. A user chooses between the activating of two networks by using a two position switch which activates one of the networks or the reset switch. The two position switch, i.e., a rotary, rocker or push button, is constructed so that it is impossible to switch between the two networks before first activating the reset switch, which takes the random access memory RAM to ground, thereby preventing data from being transferred between the two networks. By preventing the transfer of data between the two networks, each of the systems can have a different level of security.

Other objects and features of the present invention will be apparent from the following detailed description of the preferred embodiment.

BRIEF DESCRIPTION OF THE DRAWINGS

The invention will be further described in conjunction with the accompanying drawings, in which.

DETAILED DESCRIPTION OF THE PREFERRED EMBODIMENT

Figure 1:
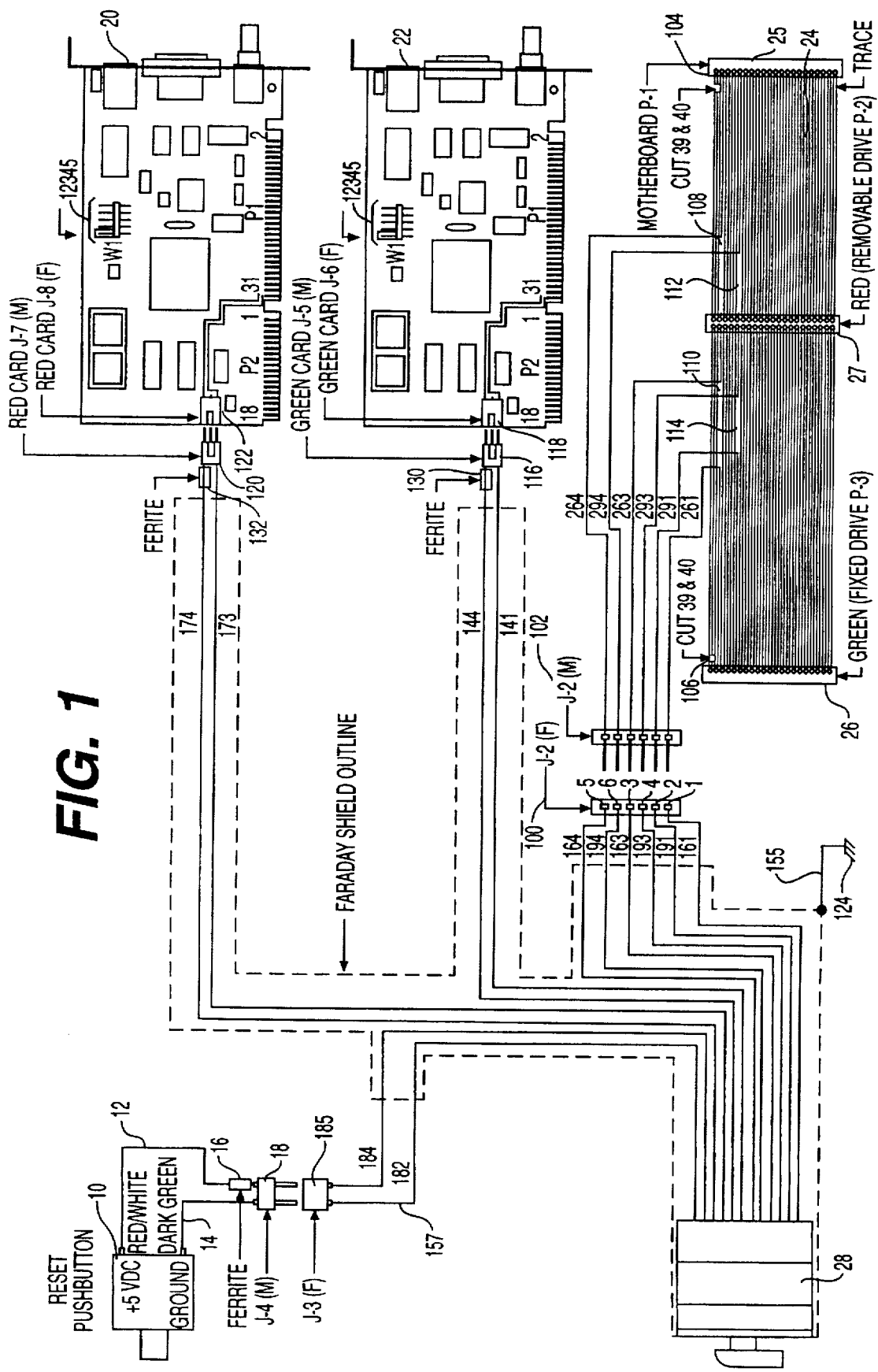
FIG. 1 is a schematic diagram of a preferred embodiment of the computer system of the present invention.

With reference to the Figures, wherein like reference characters indicate like elements throughout the several views and, in particular, with reference to FIG. 1, a schematic diagram of a preferred embodiment of the present invention is illustrated. Many of the conventional features of a computer system such as the motherboard, CPU, RAM, hard drive, power supply, etc. have been omitted for clarity.

Reset button 10 is a conventional reset pushbutton found in a typical personal computer. It includes a powered line 12 and a grounded line 14. In the embodiment shown, activating reset button 10 supplies a voltage of 5V to reboot the computer system and clear the random access memory (RAM). Powered line 12 includes ferrite shielding 16 at one end and both powered line 12 and grounded line 14 are connected to male connector 18. Network cards 20 and 22 in the embodiment shown are identical, conventional network cards. However, it is contemplated that in some embodiments, one of the network cards may include a locking means to secure data on the network to which the network card is connected. Both network cards 20 and 22 are installed on the motherboard of the computer (not shown) and can be connected to separate external network systems (not shown).

Hard drive ribbon cable 24 is connected to the motherboard of the computer (not shown) and two different hard drives (not shown). In the embodiment shown, motherboard connector 25 is connected to the motherboard, hard drive connector 26 is connected to a fixed IDE hard drive and hard drive connector 27 is connected to a removable IDE hard drive, but may also be connected to a second fixed hard drive. Although the illustrated embodiment uses particular types of conventional hard drives for storage, it is contemplated that the present invention can be used with other forms of data storage such as SCSI drives, read/write optical drives, etc.

Figure 2:
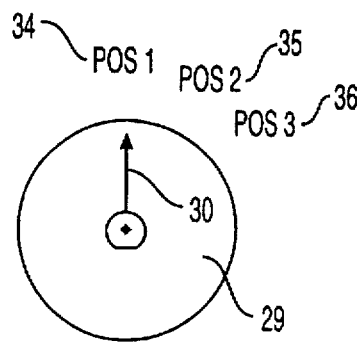
FIG. 2 illustrates the knob of the rotary selector switch of the present invention.
Figure 3:
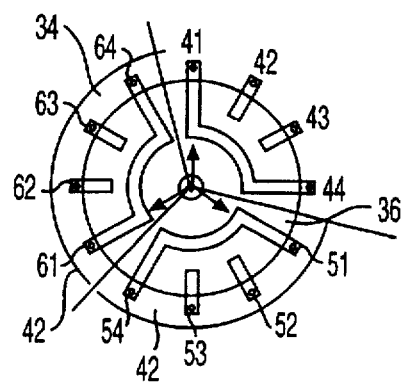
FIG. 3 illustrates the upper deck of the rotary selector switch of FIG. 2.
Figure 4:
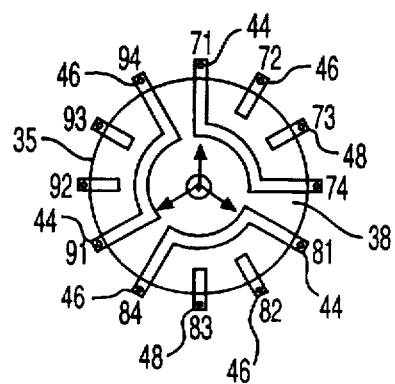
FIG. 4 illustrates the lower deck of the rotary selector switch of FIG. 3 and 4.
Figure 5:
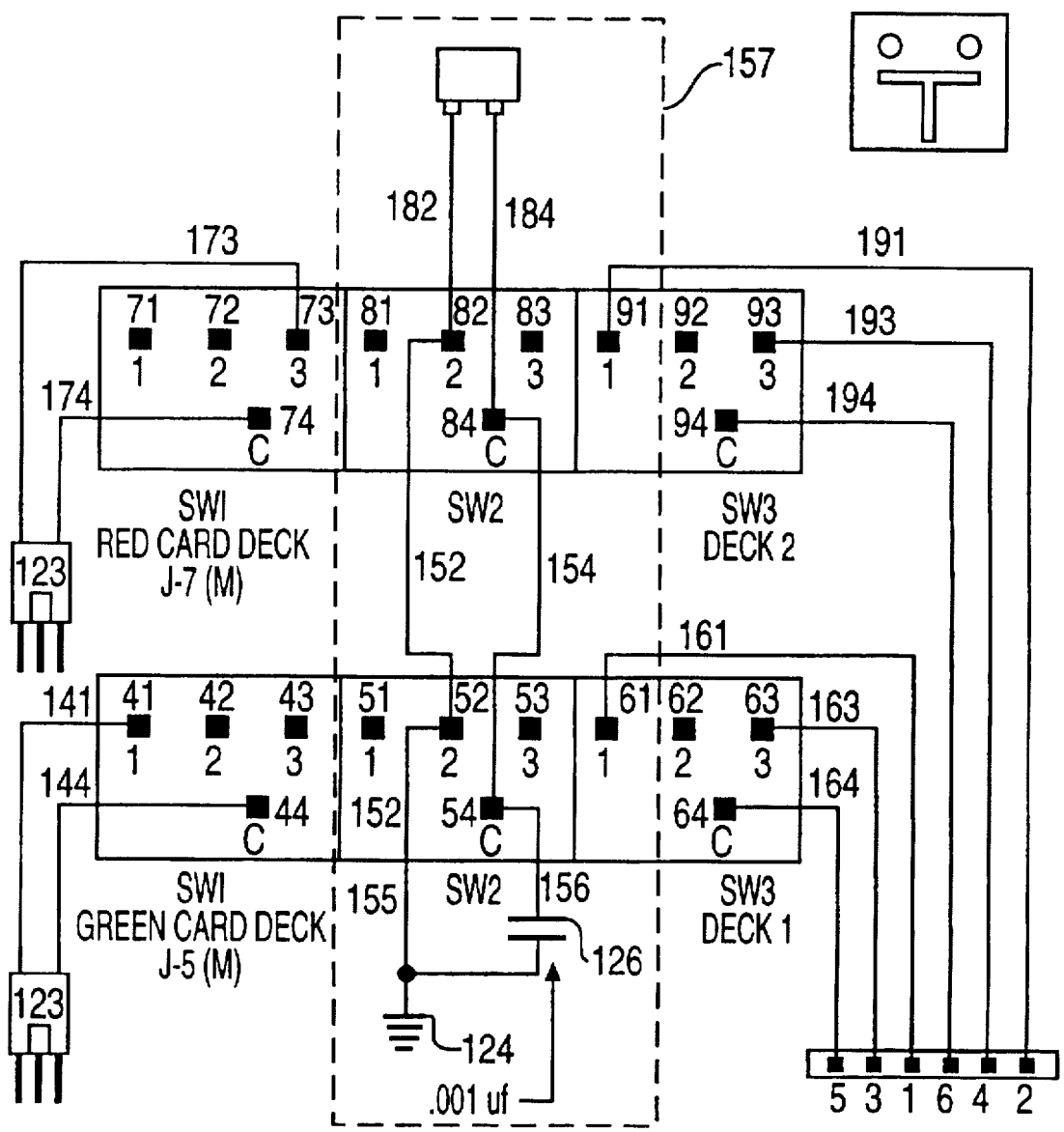
FIG. 5 is a schematic diagram of the rotary selector switch of FIGS. 2, 3 and 4 and the connections of the rotary selector switch to the computer of the present invention.

Rotary selector switch 28 is a conventional rotary selector switch having three positions, as shown in greater detail in FIGS. 2, 3, 4 and 5. FIG. 2 shows knob 29 and an indicator arrow 30 of rotary selector switch 28. Knob 29 is rotatably connected to first deck 32 and second deck 33 which lie on top of each other. As knob 29 is turned, indicator arrow 30 moves from a first position 34 to a second position 35 to a third position 36. First deck 32 includes nine positional deck switches 41, 42, 43, 51, 52, 53, 61, 62 and 63 and three common deck switches 44, 54 and 64. Second deck 33 includes nine positional deck switches 71, 72, 73, 81, 82, 83, 91, 92 and 93 and three common deck switches 74, 84 and 94. Each of the deck switches having the same reference character in FIG. 5 and in FIG. 3 or 4 is the same deck switch.

Lines 161, 163, 164, 191, 193 and 194 are connected to respective lines 261, 263, 264, 291, 293 and 294 from hard drive cable 24 by mating connectors 100 and 102. It should be appreciated that lines 39 and 40 function respectively as drive active and ground for a conventional cable 24. Lines 39 and 40 are disabled by cuts 104 and 106 through the 39th and 40th lines of hard drive cable 24 of the preferred embodiment.

Lines 261, 263 and 264 connect the 37th line of cable 25 to rotary switch 28 by means of cuts 108 and 110. Lines 264, 263 and 261 are connected to the portion of the 37th line originating at motherboard connector 25, hard drive connector 27 and hard drive connector 26, respectively. Lines 291, 293 and 294 connect the 31st line of cable 25 to rotary switch 28 by means of cuts 112 and 114. Lines 294, 293 and 291 are connected to the portions of the 37th line of cable 25 originating at motherboard connector 25, hard drive connector 27 and hard drive connector 26, respectively.

When knob 29 is at first position 34, switches 41, 44, 61, 64 and 91 are switched on thereby activating lines 141, 144, 161, 164 and 191. In this position lines 141 and 144 connected to network card 22 by connectors 116 and 118 activate network card 22 and lines 161, 164 and 191 activate the fixed hard drive (not shown) connected to connector 26. When they are activated, the fixed hard drive and network card 22 form a first network. Reset button 10, the hard drive connected to connector 27 and network card 20 are inactive when knob 29 is at first position 34.

When knob 29 is at third position 36, switches 63, 73, 74, 93 and 94 are switched on thereby activating lines 163, 173, 174, 193 and 194. In this position lines 173 and 174 connected to network card 20 by connectors 120 and 122 to activate network card 20 and lines 161, 164 and 191 activate the removable hard drive (not shown) connected to connector 27. When they are activated, removable hard drive and network card 20 form a second network. Reset button 10, the hard drive connected to connector 26 and network card 22 are inactive when knob 29 is at third position 36.

When knob 29 is at second position 35, switches 52, 54, 82 and 84 are activated thereby activating lines 152, 154, 155, 156, 182, and 184. Lines 182 and 184 which are connected to reset button 10 by connectors 18 and 185 activate reset button 10 which reboots the computer (not shown). Switches 52, 54, 82 and 84, lines 12, 14, 152, 154, 155, 156 and reset button 10 together form a reset circuit 157. Lines 152 and 154 electrically connect switches 82 and 83 to switches 52 and 54 respectively. Lines 155 and 156 connect switches 52 and 54, and thereby the rest of reset circuit 157, to ground 124. Line 156 is interrupted by a capacitor 126. Capacitor 126 drains the RAM of the computer to ground 124 when knob 29 is at second position 35. When knob 29 is at position 2 and reset circuit 157 is activated the first and second networks are inactivated. Because second position 35 is located between first position 34 and third position 36, reset circuit 157 is automatically activated whenever the user switches between first position 34 and third position 36.

Capacitor 126 is included as part of reset circuit 157 to ensure that the RAM is fully depowered so that data from the RAM cannot be transferred when a user switches from the first network to the second network. Often when a computer is rebooted, residual electricity present in the computer prevents the RAM from being fully erased. Therefore, data stored in RAM from when the user was using the first network could accidentally be transferred to the second network or vice versa. If one of the networks is a secured network, the security could be breached in this way. The present invention, by employing capacitor 126 ensures that the RAM is entirely erased when the computer is rebooted.

The hard drives of the first and second networks are wired in such a way that only one can be selected at a time, so that the possibility of the two hard drives being run in a master-slave combination has been totally eliminated. Therefore, it is not possible to modify the system software or change the CMOS settings of the hard drives to allow them to physically talk to each other. Each drive is in either a master mode or a totally deselected mode. In the deselected mode there is no address handshaking nor is there any communication with the drive in any manner, thereby totally eliminating the transfer of data from one network to the other.

The various lines extending from reset switch 28 are preferably shielded in a Faraday shield as shown by dashed lines 128. A typical Faraday shield for rotary switch 28 is made of 50 mill copper. Lines 144 and 174 are also preferably encased in ferrite 130 and 132 respectively to reduce electromagnetic interference.

In order to produce two networks having differing levels of data security, at least one of the first and second networks is provided with a known security system which locks the network until it is unlocked by a physical key, a hardware key, a password etc. An example of a password security system of the type that may be used in the present invention is described in U.S. Pat. No. 5,375,243, the entire contents and disclosure of which is hereby incorporated by reference. Another example of a security system which may be used with the present invention which involves a security software program, a hardware key and a user password is described in U.S. Pat. No. 5,212,729 to Schafer, the entire contents and disclosure of which is hereby incorporated by reference.

Yet another example of a security system which may be used with the present invention that involves using a plug-in expansion card is described in U.S. Pat. No. 5,012,514 to Renton, the entire contents and disclosure of which are hereby incorporated by reference. The security systems described in the patents listed above are but a partial list of the known data security systems that can be used with the present invention.

If a user wishes to attach a modem to the non-secure network, the power line to the modem can be disabled using rotary switch 28. When rotary switch 28 is at a position activating the secured network, the power to the modem would be turned off. Alternatively, if the user wishes to attach a modem to the secured side, activating the non-secured network would turn off power to the modem.

When the present invention is used with a SCSI hard drive, an additional deck can be added to rotary switch 28 and a SCSI cable can be modified in a way similar to the way that ribbon cable 24 for the IDE drives of the illustrated embodiment have been modified.

Although for convenience the computer system of the invention has been described for a system having two different security levels, the present invention also includes systems having 3 or more levels of security involving the use of additional networks. A switch for such a system would include a reset position between each pair of network activated positions: between the first and second network activated positions, the second and third activated positions, the third and fourth network activated positions, etc. Also, the invention contemplates a switch in which the last network activated position and the first network activated position are separated by a reset position. For example, for four networks, there could be a reset position between the fourth and first network activated positions.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. A computer system comprising:

a computer including a central processing unit coupled to a random access memory and a power supply;

at least two networks including a first network comprising said computer coupled to a first network card and a first data storage means and a second network comprising said computer coupled to a second network card and second data storage means, at least one of said first and second networks including means for locking the storage means of said network;

reset means for rebooting said central processing unit and for clearing said random access memory; and user actuated switching means coupled to said first and second networks and for switching said computer system between three states:

a first state wherein said first network is activated, said second network card, said second data storage means, and said reset means are inactivated, a second state in which said second network is activated and said first network card, said first data storage means, and said reset means are inactivated, and a third state in which said reset means is activated and said first and second networks are inactivated;

said computer system being switched to said third state whenever said computer system is switched between said first and second states whereby data is unable to be transferred between said first and second networks.

2. The computer system according to claim 1, wherein said locking means comprises a password data security system.

3. The computer system according to claim 1, wherein said locking means comprises a hardware key data security system.

4. The computer system according to claim 1, wherein said switching means is selected from the group consisting of: rotary switches, rocker switches, and push button switches.

5. The computer system according to claim 1, wherein said reset means comprises a capacitor connected to a ground for completely depowering the RAM of said computer system.

6. The computer system according to claim 1, wherein at least one of said data storage means comprises an IDE hard drive.

7. The computer system according to claim 1, wherein each of said data storage means comprises an IDE hard drive.

8. A computer system comprising:

a computer including a central processing unit coupled to a random access memory and a power supply;

at least two networks including a first network comprising said computer coupled to a first network card and a first data storage means and a second network comprising said computer coupled to a second network card and second data storage means, at least one of said first and second networks including means for locking the storage means of said network, wherein at least one of said data storage means comprises an IDE hard drive;

reset means for rebooting said central processing unit and for clearing said random access memory; and user actuated switching means coupled to said first and second networks and for switching said computer system between three states:

a first state wherein said first network is activated, said second network card, said second data storage means, and said reset means are inactivated, a second state in which said second network is activated and said first network card, said first data storage means, and said reset means are inactivated, and a third state in which said reset means is activated and said first and second networks are inactivated;

said computer system being switched to said third state whenever said computer system is switched between said first and second states whereby data is unable to be transferred between said first and second networks.

9. The computer system according to claim 8, wherein said locking means comprises a password data security system.

10. The computer system according to claim 8, wherein said locking means comprises a hardware key data security system.

11. The computer system according to claim 8, wherein said reset means comprises a capacitor connected to a ground for completely depowering the RAM of said computer system.

12. The computer system according to claim 8, wherein each of said data storage means comprises an IDE hard drive.

13. A computer system comprising:

a computer including a central processing unit coupled to a random access memory and a power supply;

at least two networks including a first network comprising said computer coupled to a first network card and a first data storage means and a second network comprising said computer coupled to a second network card and second data storage means, at least one of said first and second networks including means for locking the storage means of said network, wherein at least one of said data storage means comprises an IDE hard drive;

reset means for rebooting said central processing unit and for clearing said random access memory, said reset means comprising a capacitor connected to a ground for completely depowering the RAM of said computer system; and user actuated switching means coupled to said first and second networks and for switching said computer system between three states:
- a first state wherein said first network is activated, said second network card, said second data storage means, and said reset means are inactivated,
- a second state in which said second network is activated and said first network card, said first data storage means, and said reset means are inactivated, and
- a third state in which said reset means is activated and said first and second networks are inactivated;

said computer system being switched to said third state whenever said computer system is switched between said first and second states whereby data is unable to be transferred between said first and second networks.

14. The computer system according to claim 13, wherein said locking means comprises a password data security system.

15. The computer system according to claim 13, wherein said locking means comprises a hardware key data security system.

16. The computer system according to claim 13, wherein each of said data storage means comprises an IDE hard drive.

* * * * *